(12) United States Patent
Starukhin et al.

(10) Patent No.: US 11,282,118 B2
(45) Date of Patent: Mar. 22, 2022

(54) ORDER MANAGEMENT USER INTERFACE

(71) Applicant: salesforce.com, inc., San Francisco, CA (US)

(72) Inventors: Michael Starukhin, Parkland, FL (US); Cassandra Funk, Mount Prospect, IL (US); Richard Farah, Coconut Creek, FL (US); Daryn Cox, Layton, UT (US); Steven Derochemont, Lighthouse Point, FL (US)

(73) Assignee: salesforce.com, inc., San Francisco, CA (US)

( * ) Notice: Subject to any disclaimer, the term of this patent is extended or adjusted under 35 U.S.C. 154(b) by 44 days.

(21) Appl. No.: 16/573,497

(22) Filed: Sep. 17, 2019

(65) Prior Publication Data
US 2021/0082009 A1 Mar. 18, 2021

(51) Int. Cl.
*G06Q 30/04* (2012.01)
*G06F 9/451* (2018.01)

(52) U.S. Cl.
CPC .............. *G06Q 30/04* (2013.01); *G06F 9/451* (2018.02)

(58) Field of Classification Search
CPC .............................. G06Q 30/04; G06F 9/451
See application file for complete search history.

(56) References Cited

U.S. PATENT DOCUMENTS

| | | | | |
|---|---|---|---|---|
| 7,499,871 | B1* | 3/2009 | McBrayer | G06Q 10/063 705/7.13 |
| 8,185,453 | B1* | 5/2012 | Baeck | G06Q 10/06 705/30 |
| 8,639,555 | B1* | 1/2014 | Johnston | G06Q 10/0633 705/7.27 |
| 9,501,202 | B2* | 11/2016 | Wang | G06F 16/951 |
| 9,904,585 | B1* | 2/2018 | Islam | G06F 11/079 |
| 9,904,898 | B2* | 2/2018 | Addala | G06Q 10/06393 |
| 9,911,092 | B2* | 3/2018 | Goja | G06Q 10/0633 |
| 10,496,943 | B2* | 12/2019 | De | G06Q 10/063118 |
| 10,643,157 | B2* | 5/2020 | De | G06Q 10/063114 |
| 10,725,639 | B1* | 7/2020 | Ponce de Leon | G06F 3/04842 |
| 10,891,569 | B1* | 1/2021 | Werner | G06F 8/71 |

(Continued)

*Primary Examiner* — Tadesse Hailu
(74) *Attorney, Agent, or Firm* — Sterne, Kessler, Goldstein & Fox P.L.L.C.

(57) ABSTRACT

Disclosed herein are system, method, and device embodiments for implementing an order management graphical user interface (GUI). An application service may monitor completion of a workflow associated with a purchase order, generate a GUI layout associated with the purchase order, the GUI layout including a graphical workflow frame dimensioned to present a predicted amount of graphical representations associated with the workflow, and a detailed information frame. Further, the application service may generate a first graphical representation representing the purchase order and the order status, generate a graphical area corresponding to an operation of the plurality of operations for providing the product to the customer, determine performance of the operation based on the monitoring, generate a second graphical representation within the graphical area based on the performance of the operation, and generate a connection item between the first graphical representation and the second graphical representation.

20 Claims, 7 Drawing Sheets

(56) References Cited

U.S. PATENT DOCUMENTS

| | | | |
|---|---|---|---|
| 2002/0180810 A1* | 12/2002 | Charters | G06Q 10/10 715/853 |
| 2002/0186254 A1* | 12/2002 | Monbaron | G06Q 10/10 715/810 |
| 2002/0188530 A1* | 12/2002 | Wojcik | G06Q 30/04 705/28 |
| 2002/0188597 A1* | 12/2002 | Kern | G06Q 30/06 |
| 2003/0065574 A1* | 4/2003 | Lawrence | G06Q 30/06 705/26.82 |
| 2003/0078801 A1* | 4/2003 | Cope | G06F 21/6218 705/7.26 |
| 2003/0233374 A1* | 12/2003 | Spinola | G06Q 10/08 |
| 2004/0133876 A1* | 7/2004 | Sproule | G06Q 10/067 717/105 |
| 2006/0074735 A1* | 4/2006 | Shukla | G06F 8/34 705/80 |
| 2007/0011624 A1* | 1/2007 | Olsen | G06Q 10/10 715/811 |
| 2007/0245300 A1* | 10/2007 | Chan | G06Q 10/06 717/105 |
| 2007/0288412 A1* | 12/2007 | Linehan | G06Q 10/06 706/45 |
| 2008/0027788 A1* | 1/2008 | Lawrence | G06Q 30/0204 705/7.33 |
| 2008/0240119 A1* | 10/2008 | Wylie | H04L 41/22 370/400 |
| 2008/0270977 A1* | 10/2008 | Nucci | G06F 3/0482 717/105 |
| 2010/0057669 A1* | 3/2010 | Gandini | G06Q 30/06 707/E17.001 |
| 2010/0293027 A1* | 11/2010 | Du Fosse | G06Q 10/06316 705/7.26 |
| 2010/0306020 A1* | 12/2010 | Lo | G06Q 10/06316 705/7.27 |
| 2011/0307856 A1* | 12/2011 | Klaka | G06Q 10/06 717/104 |
| 2013/0145300 A1* | 6/2013 | Mackay | G06F 3/0481 715/772 |
| 2013/0275475 A1* | 10/2013 | Ahlborn | G06Q 10/0633 707/812 |
| 2014/0025426 A1* | 1/2014 | Doehring | G06Q 10/0633 705/7.27 |
| 2014/0337175 A1* | 11/2014 | Katzin | G06Q 30/00 705/26.62 |
| 2017/0316363 A1* | 11/2017 | Siciliano | G06Q 10/10 |
| 2020/0050983 A1* | 2/2020 | Balasubramanian | G06F 11/3423 |
| 2020/0174756 A1* | 6/2020 | Cerar | G06F 8/30 |

* cited by examiner

ORDER MANAGEMENT USER INTERFACE

BACKGROUND

Typically, order management operators are required to use multiple applications and/or user interfaces to monitor performance of an order fulfillment workflow. For example, an order management operator may utilize separate applications to track fulfillment processes, shipment processes, customer relationship management, and payment processes. However, relying on a multiple applications and user interfaces can become cumbersome and create usability concerns. In addition, relying on multiple systems or users interface may lead to an order management operator being unaware of the appropriate tool to employ to find specific information, or presented with conflicting order management information by the various user interfaces or applications.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for implementing a workflow management GUI.

Figure 1A:
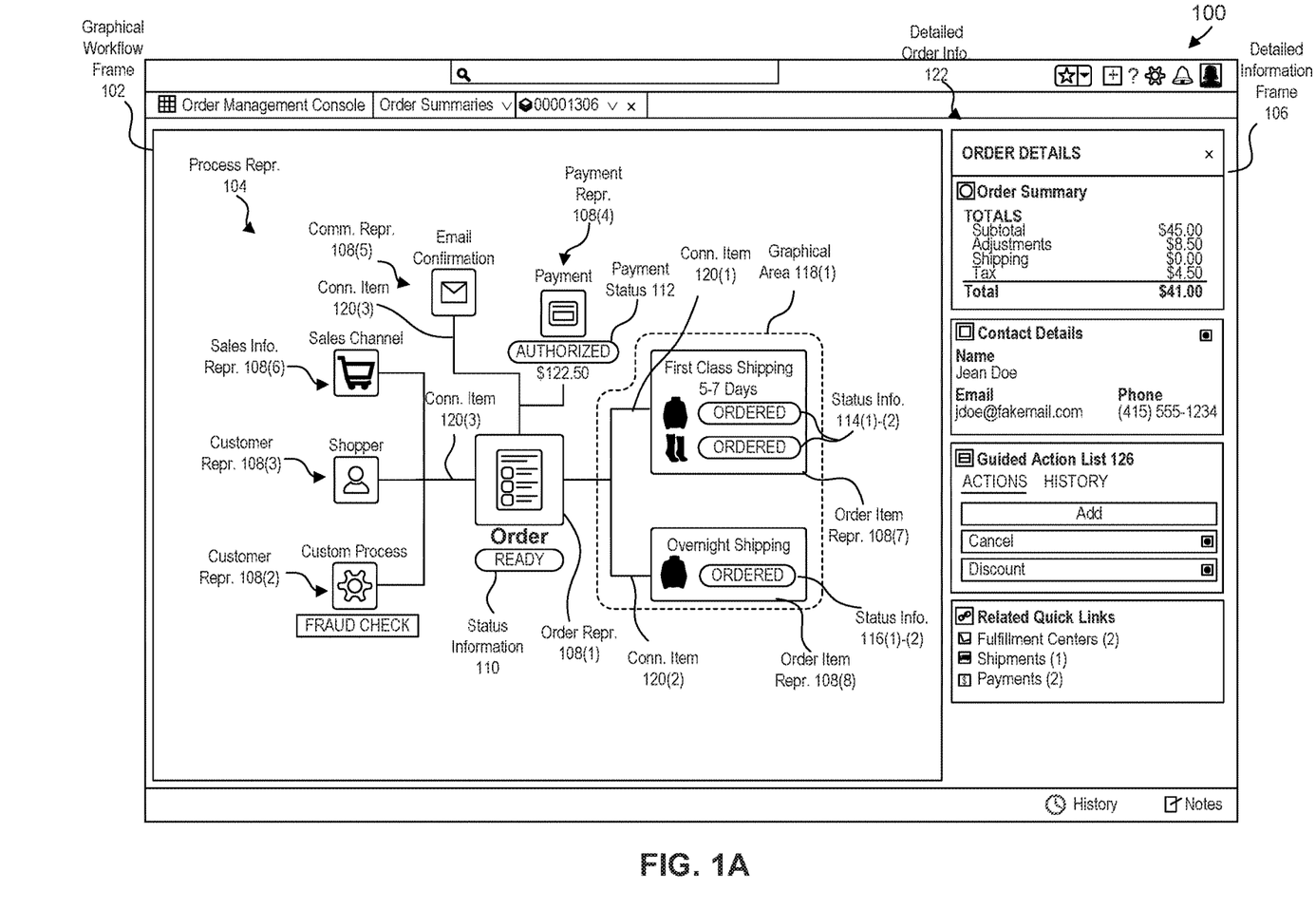
FIGS. 1A-1B illustrate an example order management GUI, according to some embodiments of the present disclosure.

FIG. 1A illustrates an example order management GUI, according to some embodiments of the present disclosure. As illustrated in FIG. 1A, the order management GUI 100 may include a graphical workflow frame 102 for displaying a graphical representation (i.e., the process representation 104) of a workflow process, and a detailed information frame 106 for displaying information particular to one or more steps of the workflow process or entities (e.g., customers, merchants, payment processors, etc.) associated with the workflow process. Together the graphical workflow frame 102 and the detailed information frame 106 may be configured to present a comprehensive view of the workflow process using a single user interface. As a result, embodiments herein provide usability benefits over prior technology that required users to switch between a plurality of user interfaces or applications to access information corresponding to a single workflow.

In some embodiments, the workflow process may correspond to an order fulfillment process. Further, the order fulfillment process may at least include receiving a purchase order from a customer, receiving payment information corresponding to the purchase order, processing the payment information for the purchase order, assigning the items of the purchase order to one or more fulfillment centers, packaging the items of the purchase order at the fulfillment centers, assigning the items of the purchase order to one or more shipping entities, monitoring delivery of the items by the shipping entities, confirming delivery of the items, sending one or more order digital notifications to entities associated with the purchase order, and conducting communication sessions with any of the entities associated with the purchase order.

For instance, a customer may purchase three clothing items from an e-commerce web application. Further, the customer may select a first shipping option for two of the clothing items, and a second shipping option for the remaining clothing item. Upon receipt of the purchase order for the clothing items, an order management application may manage and/or monitor fulfillment of the purchase order for the clothing items across various fulfillment related systems (e.g., one or more fulfillment center systems, one or more shipping entities, a payment processor, etc.).

In some embodiments, the order management application may generate a purchase order identifying the clothing items, the shipping method of each clothing item, and a fulfillment status of each clothing item. Further, the order management application may track shipment of the clothing items by a shipping entity responsible for delivering the clothing items to the customer. Additionally, the order management application may generate and update the order management GUI 100 based on the performance of the order fulfillment process. As used herein, and in some embodiments, an "application" may refer to any computer program or software (e.g., client, agent, application, mobile application, web application, hybrid application, computer program, desktop application, or module) operable to run on an electronic device.

As illustrated in FIG. 1A, the graphical workflow frame 102 may include a plurality of graphical representations 108(1)-(N) corresponding to the order fulfillment process for the purchase order. In some embodiments, the graphical representations 108(1)-(N) may include an order representation 108(1) corresponding to the purchase order for the clothing items, a custom process representation 108(2) corresponding to a custom process, a customer representation 108(3) corresponding to the customer that ordered the clothing items, a payment representation 108(4) corresponding to the payment for the purchase order, a communication representation 108(5) indicating that an electronic confirmation (e.g., e-mail, text message, etc.) has been sent to the customer, a sales information representation 108(6) corresponding to a sales channel, a first order item representation 108(7) corresponding to the clothing items ordered with first class shipping, and a second order item representation 108(8) corresponding to the clothing item order with overnight shipping.

As further illustrated in FIG. 1A, the graphical representations 108(1)-(N) may include textual information. For example, the order representation 108(1) may include order information 110 indicating the order status of the purchase order, and the payment representation 108(4) may include payment information 112 indicating the status of the payment process for the purchase order. As another example, the first order item representation 108(7) may include status information 114(1)-(2) and a graphical representation of the related items (i.e., the clothing items being shipped via the first class shipping option), while the second order item representation 108(8) may include status information 116 and a graphical representation of the related item (i.e., the clothing item being shipped via the overnight shipping option).

In some embodiments, the order management application may include a layout algorithm for determining a layout of the graphical workflow frame 102. For instance, the layout algorithm may be configured to determine a layout of graphical representations 108(1)-(N) within the process representation 104. Further, the layout algorithm may determine the layout at the initiation of the workflow process with the objective of selecting a layout best suited for efficiently displaying any graphical representations 108(1)-(N) that may be added to the process representation 104 during performance of the workflow process. As referred to herein, in some embodiments, a "layout" may refer to the horizontal or vertical alignment of graphical representations 108(1)-(N) within the graphical workflow frame 102, the spacing between graphical representations 108(1)-(N) within the graphical workflow frame 102, the position of graphical representations 108(1)-(N) within the graphical workflow frame 102, the size of graphical representations 108(1)-(N) within the graphical workflow frame 102, graphical effects applied to graphical representations 108(1)-(N) within the graphical workflow frame 102, the attributes of connection items within the graphical workflow frame 102, the direction of growth of the process representation 104, attributes of textual information presented within the graphical workflow frame 102, etc.

In some embodiments, the layout algorithm may determine the layout based on attributes of the purchase order, and any graphical representations 108(1)-(N) that may be added to the process representation 104. In some embodiments, the layout algorithm may determine the graphical representations that may be added to the process representation 104 based on the workflow process that will be performed to fulfil the purchase order. As an example, a purchase order including a high amount of order items or a high amount of delivery recipients may be expected to have a high number of graphical representations added to the process representation 104 during performance of the workflow process. As such, the layout algorithm may dimension the graphical representations 108(1)-(N) to have a smaller size, or reduce the amount of textual information displayed with the graphical representations. Instead, the textual information may be displayed within the detailed information frame 106.

As another example, the layout algorithm may identify the different workflow steps of the workflow process, assign a graphical area to individual workflow steps, and determine the layout based on dimensioning and aligning the graphical areas. For instance, the layout algorithm may determine that the process representation 104 will include a first graphical area including graphical representations for the fulfillment orders of items of the purchase order, and a second graphical area including graphical representations for invoice processing and order item delivery. Further, the layout algorithm may determine the size of the graphical areas based on an expected number of graphical representations within the graphical areas, the alignment of the graphical areas based upon the relationship between the corresponding workflow steps, and the alignment of graphical representations within the graphical areas. For instance, the layout algorithm may position the first graphical area adjacent to the second graphical area based on the likelihood that the graphical representations within the first graphical area will have a connection item with a graphical representation within the second graphical area. In another instance, the layout algorithm may position the first graphical area to left of the second graphical area based on the workflow step corresponding to the first graphical area being initiated prior to the workflow step corresponding to the second graphical area. For example, the layout algorithm may position the first graphical area to the left of the second graphical area based on the fulfillment process being initiated prior to invoice processing or the delivery process. In yet still some other instances, the layout algorithm may position the first graphical area to the left of the second graphical area based on the graphical representations within the first graphical area having a one-to-many relationship with the graphical representations within the second graphical area.

In some embodiments, the layout algorithm may set growth attributes of the process representation 104. For instance, the layout algorithm may arrange existing graphical representations least likely to have a connection with graphical representations that may be added in a first portion of the process representation 104, while arranging existing graphical representations more likely to have a connection with graphical representations that may be added in a second portion of the process representation 104. Accordingly, the process representation 104 will grow from the second portion of process representation 104 as graphical representations are added to the process representation 104. Further, the layout algorithm may set the process representation 104 to grow in a particular direction based on a writing system directionality of a user. For example, the layout algorithm may determine that the order management GUI will be presented to a user associated with a right-to-left writing system. Accordingly, the layout algorithm may place the graphical representations least likely to have a connection item with graphical representations that will be added on the left side of the graphical workflow frame 102 to allow the process representation 104 to grow in the direction in which the user is accustomed to reading text.

Further, the layout algorithm may be configured to align a first order item representation 108(7) corresponding to the clothing items ordered with first class shipping, and a second order item representation 108(8) corresponding to the clothing item order with overnight shipping to form a graphical area 118(1). By placing the first order item representation 108(7) and second order item representation 108(8) within the graphical area 118(1), the process representation 104 conveys that the information within the graphical area 118(1) corresponds to a specific workflow step of the workflow process. For instance, aligning the first order item representation 108(7) and the second order item representation 108(8) within the graphical area 118(1) conveys that the user should review or interact with the graphical representations within the graphical area 118 to locate shipping information associated with the order fulfillment process.

As illustrated in FIG. 1A, the process representation 104 may include connection items 120(1)-(N) between the graphical representations 108(1)-(N). Further, the connection items 120(1)-(N) may indicate relationships between the graphical representations 108(1)-(N) and/or the entities represented by the graphical representations 108(1)-(N). For example, the connection item 120(1), between the order representation 108(1) and the first order item representation 108(7), may indicate that the clothing items represented by the first order item representation 108(7) belong to the purchase order represented by the order representation 108(1). As another example, the connection item 120(2), between the order representation 108(1) and the second order item representation 108(8), may indicate that the clothing item represented by the second order item representation 108(8) belongs to the purchase order represented by the order representation 108(1). As another example, the connection item 120(3), between the order representation 108(1) and the payment representation 108(4), may indicate that the payment information presented by the payment representation 108(4) corresponds to payment for the purchase order represented by the order representation 108(1). As yet still another example, the connection item 120(4), between the order representation 108(1) and the communication representation, may indicate that the communication information presented by the communication representation corresponds to communication transcripts associated with the purchase order represented by the order representation 108(1).

In addition, the order management application may apply graphical effects to a connection item 120 to convey information about one of the graphical representations associated with the connection item 120, or the relationship between the graphical representations associated with the connection item 120. Some examples of graphical effects include line format (e.g., solid, dashed, dotted), line color, line weight, animation, or line color scheme (e.g., brightness, intensity, lightness, darkness. For instance, the connection items 120(1)-(N) may have a default color (e.g., grey), while the color green may be applied to a connection item 120 associated with a successful payment. Further, in some embodiments, the color red may be applied to connection items 120(1)-(N) associated with a workflow alert or exception.

Further, in some embodiments, the graphical representations 108(1)-(N) may be selectable to view information within the detailed information frame 106. For example, as illustrated in FIG. 1A, detailed order information 122 may be presented within the detailed information frame 106 based upon selection of the order representation 108(1). Additionally, order management application may present action items within the detailed information frame 106 based upon selection of the graphical representations. For example, as illustrated in FIG. 1A, the detailed information frame 106 may include a guided action list 124 included actionable steps that may be taken with respect to the purchase order based upon selection of the order representation 108(1).

Figure 1B:
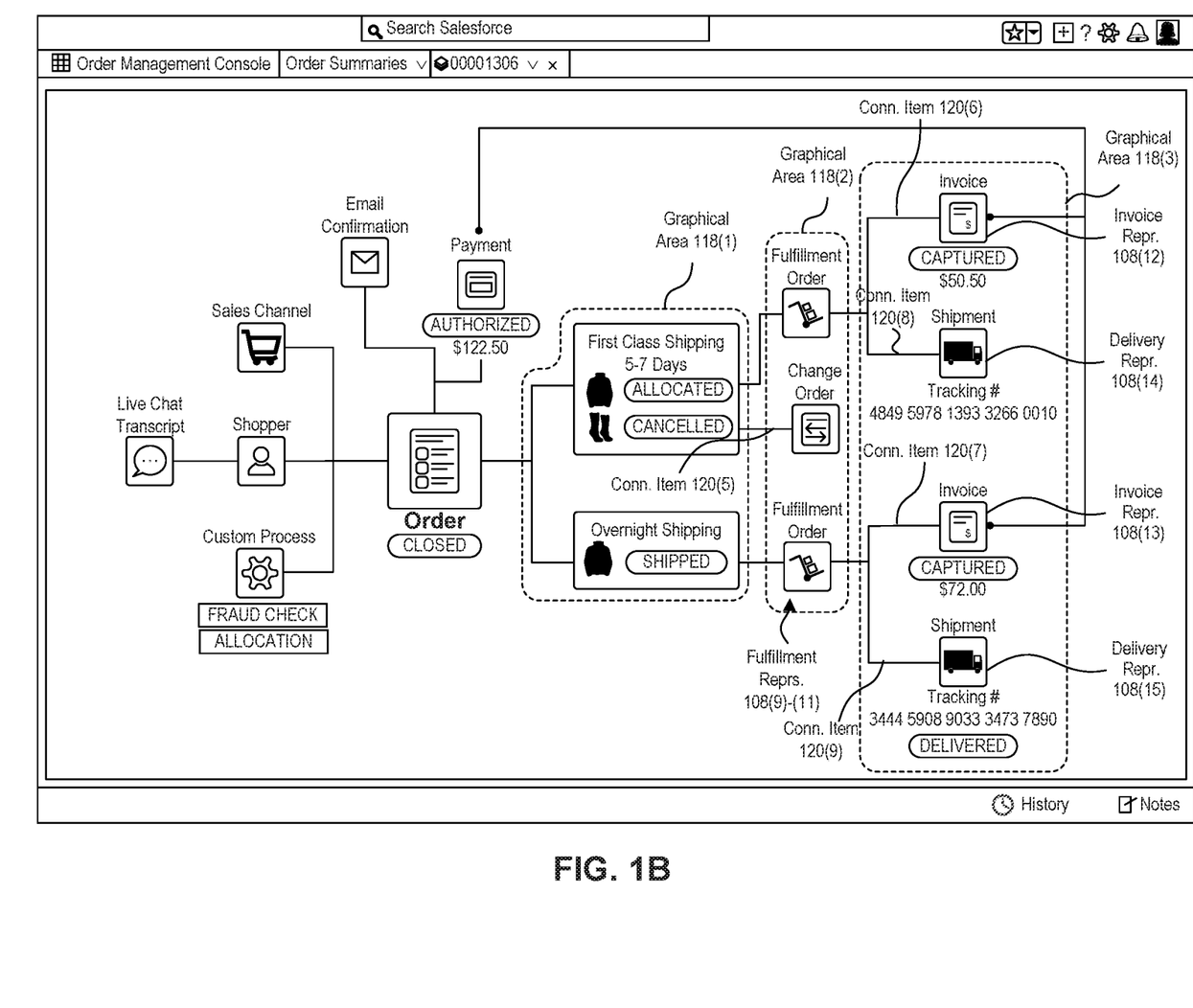

FIG. 1B illustrates an example order management GUI, according to some embodiments of the present disclosure. As illustrated in FIG. 1B, the order management application may modify the process representation 104 to reflect order fulfillment activity. For example, the status information of the first order item representation 108(7) may be updated to reflect that fulfillment of one of the clothing items has been cancelled. As another example, the status information of the second order item representation 108(8) may be updated to reflect that the clothing item represented by the second order item representation 108(8) has been shipped to a recipient.

Further, in some embodiments, the order management application may add additional graphical areas and graphical representations to the process representation 104. For example, the order management application may add a graphical area 118(2) including fulfillment representations 108(9)-(11) for the fulfillment orders of the purchase order, and a graphical area 118(3) including invoice representations 108(12)-(13) corresponding to invoice processing for the clothing items and delivery representations 108(14)-(15) corresponding to the delivery process of the clothing items.

In some embodiments, the fulfillment representation 108(10) may include text or a graphical icon indicating that a modification has been made to a fulfillment order. For instance, as illustrated in FIG. 1B, the fulfillment representation 108(10) may indicate that a change order has been processed. Further, based on the alignment between the graphical area 118(1) and the graphical area 118(2), and the connection item 120(5) between the first order item representation 108(7) and the fulfillment representation 108(10), a user may be able to determine that the change order occurred at the fulfillment step of the workflow process and pertains to a canceled clothing item of the purchase order.

Further, as illustrated in FIG. 1B, the process representation 104 may include the invoice representation 108(12) with the connection item 120(6) to the first order item representation 108(7), and the invoice representation 108(13) with the connection item 120(7) to the second order item representation 108(8). The connection items 120(6)-(7) may indicate that the invoice representations 108(12)-(13) correspond to invoice information for payment received for the purchase order. Further, in some embodiments, the invoice representations 108(12)-(13) may include status information and monetary amounts. Additionally, as illustrated in FIG. 1B, the process representation 104 may include the delivery representation 108(14) with the connection item 120(8) to the first order item representation 108(7), and the delivery representation 108(15) with the connection item 120(9) to the second order item representation 108(8). The connection items 120(8)-(9) may indicate that the delivery representations 108(14)-(15) correspond to the delivery processes of the clothing items of the purchase order. Further, in some embodiments, the delivery representations 108(14)-(15) may include status information and tracking information for the delivery process.

Figure 2A:
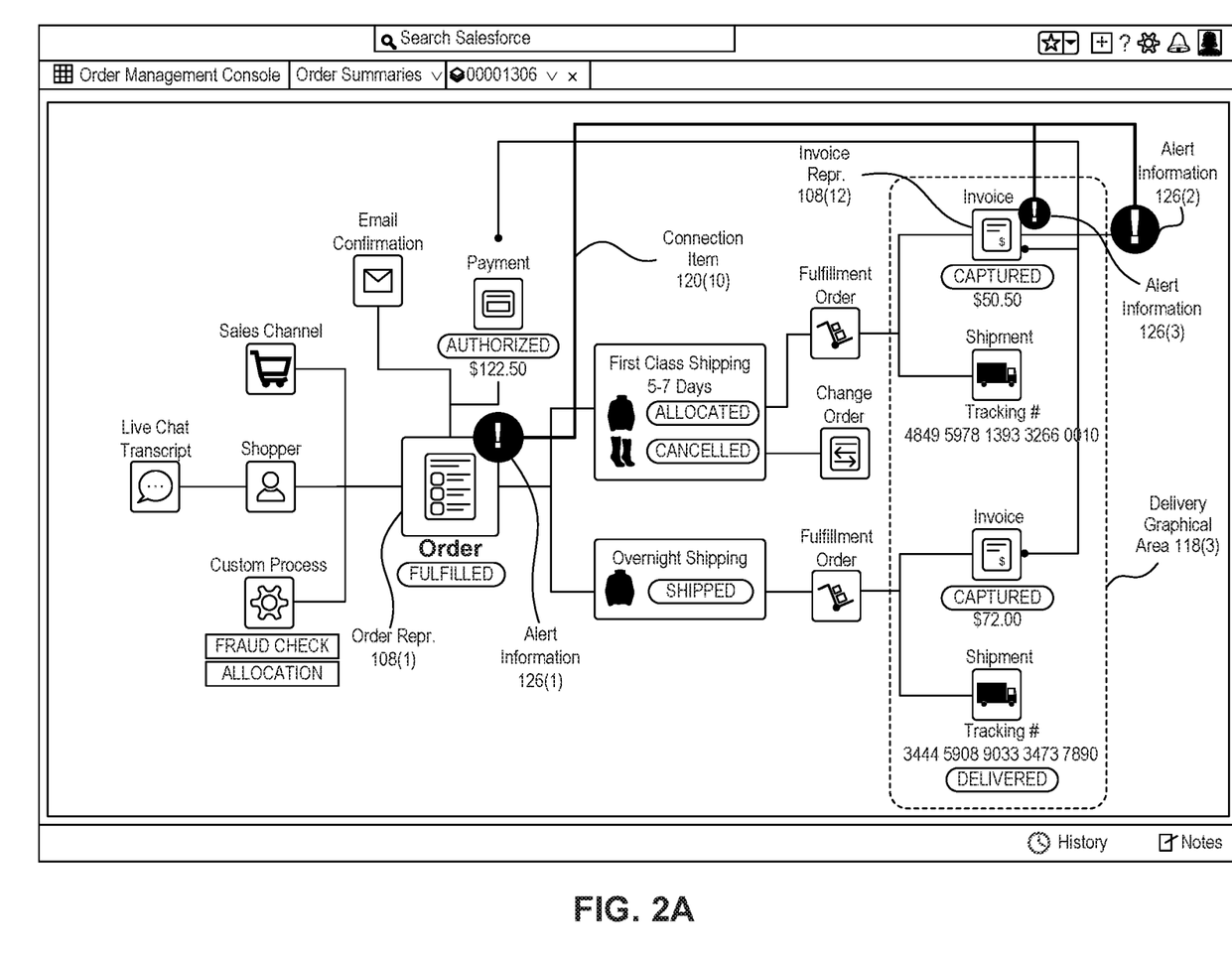
FIGS. 2A-2B illustrate an example order management GUI, according to some embodiments of the present disclosure.

FIG. 2A illustrates an example GUI of the order management interface, according to some embodiments of the present disclosure. As illustrated in FIG. 2A, in some embodiments, the graphical workflow frame 102 may include alert representations 126(1)-(3) indicating that a workflow error or exception has occurred. For example, the order management application may display the general alert representation 126(1) in proximity to the order representation 108(1) to indicate that a workflow exception has occurred during the workflow process associated with the process representation 104. In addition, the order management application may display specific alert representations 126(2)-(3) in proximity to the graphical representation associated with the workflow exception. For instance, the order management application may display the alert representation 126(2) in proximity to the invoice representation 108(12) in response to a workflow exception occurring during the invoice processing associated with the invoice representation 108(2). Although three alert representations may be used in an embodiment of the invention, a person of skill in the art will recognize that other, any number of alert representations 126 may be displayed instead of or in addition to these.

Furthermore, in some embodiments, the order management application may apply graphical effects to the alert representations 126(1)-(3). Some examples of graphical effects that may be applied to an alert representation include re-sizing, color effects, animation effects, or color scheme (e.g., brightness, intensity, lightness, darkness). For example, the order management application may size an alert representation 126 corresponding to an active workflow exception larger than another alert representation 126 corresponding to a workflow exception that has been solved or addressed. As another example, the order management application may apply a pulsating animation to an alert representation 126 to indicate that the workflow exception is critical or delaying performance of the workflow process corresponding to the process representation 104. As yet another example, the order management application may use the color red for an alert representation 126 corresponding to an active workflow exception, while using the color grey for another alert representation 126 corresponding to a workflow exception that has been solved or addressed. Further, the order management application may display the connection item 120(10) between the alert representations 126(1)-(3) based on the alert representations 126(1)-(3) having a common origin. The connection item 120(10) may assist a user when identifying the workflow steps associated with the workflow exceptions 126(1)-(3).

Figure 2B:
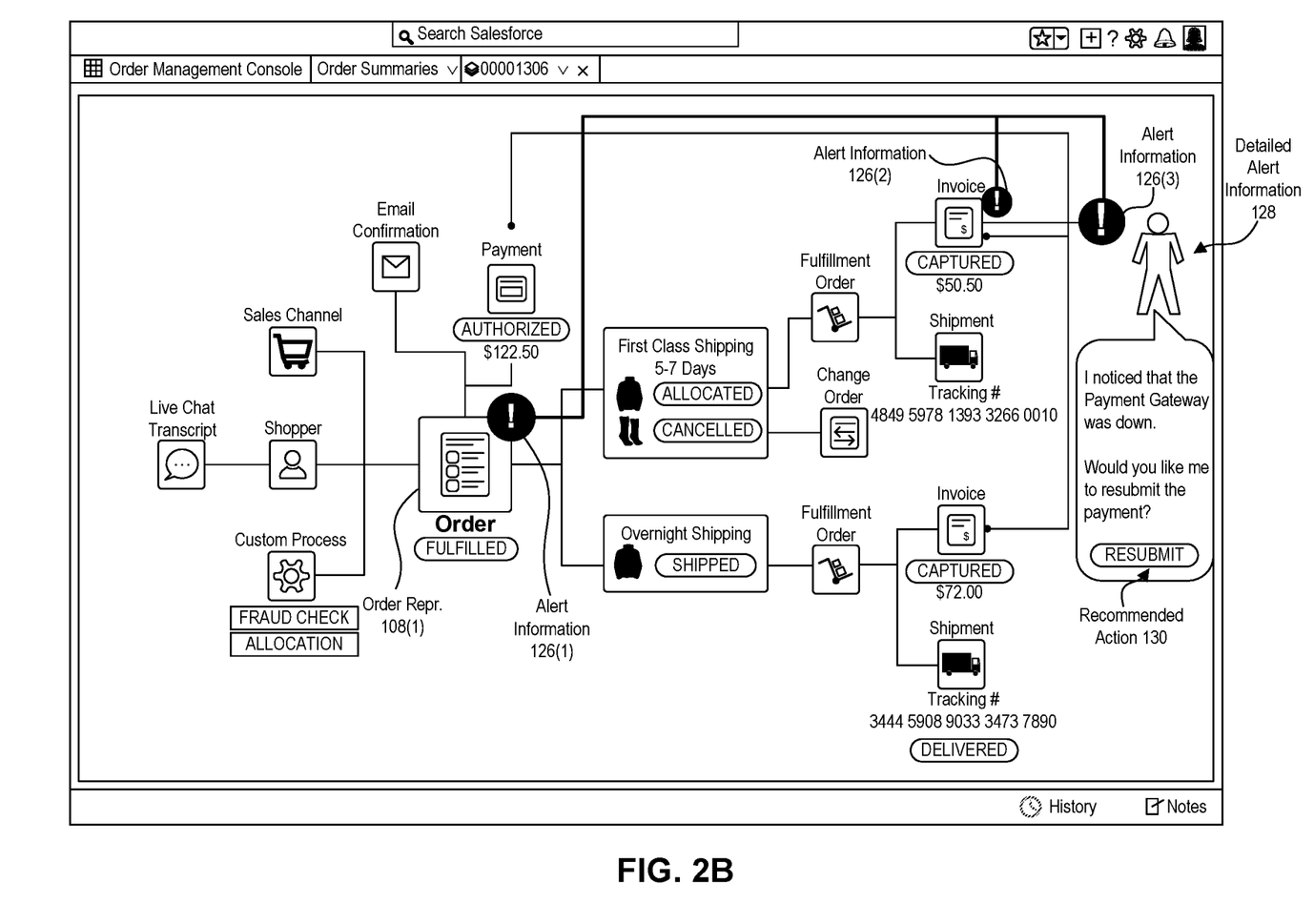

FIG. 2B illustrates an example GUI of the order management interface, according to some embodiments of the present disclosure. In some embodiments, the order management application may determine recommended actions to perform in response to workflow exceptions, and present a control enabling a user to initiate a performance of the recommended actions. For example, as illustrated in FIG. 2B, the graphical workflow frame 102 may include detailed alert information 128 and a recommended action control 130. The detailed alert information 128 may provide additional information about the alert representations 126(2)-(3). Further, the recommended action control 130 may be selectable to trigger the recommended action for curing the workflow exception corresponding to the alert representations 126(2)-(3) and the detailed alert information 128.

Figure 3:
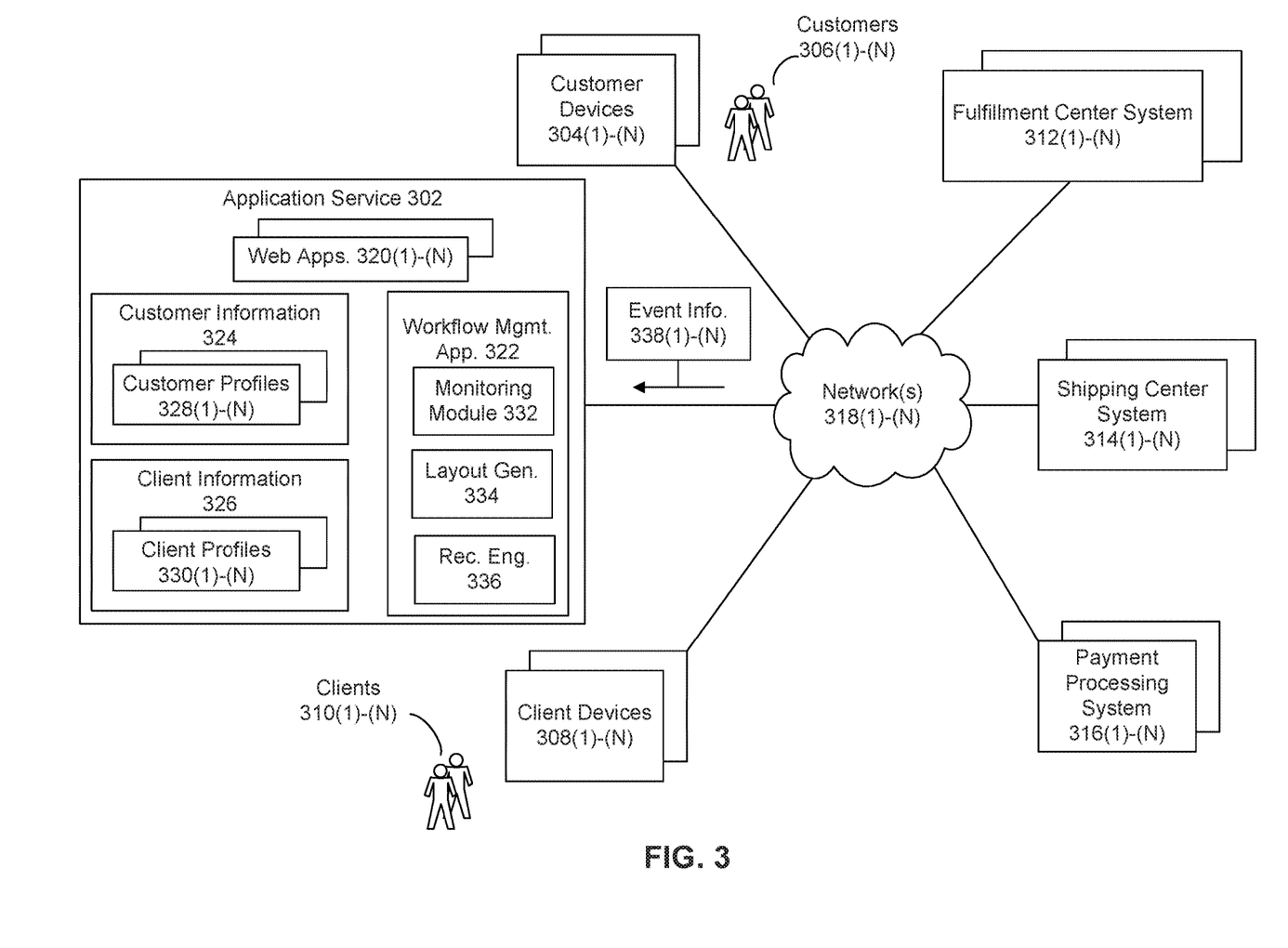
FIG. 3 is a block diagram of an example framework for implementing a workflow management GUI, according to some embodiments of the present disclosure.

FIG. 3 is a block diagram of an example framework of a system for implementing a workflow management GUI, according to some embodiments. As illustrated in FIG. 3, a workflow management system 300 may include an application service 302, a plurality of customer devices 304(1)-(N) associated with a plurality of customers 306(1)-(N), a plurality of client devices 308(1)-(N) associated with a plurality of clients 310(1)-(N), a plurality of fulfillment center systems 312(1)-(N) configured to manage fulfillment processes within a fulfillment center and provide status information of the fulfillment processes, a plurality of shipping service systems 314(1)-(N) configured to manage delivery processes by a shipping entity and provide tracking information of the delivery processes, and a plurality of payment processing systems 316(1)-(N) configured to receive payment information, process payment information, and provide status information of payment processes.

Additionally, the application service 302, the customer devices 304(1)-(N), and the client devices 308(1)-(N), the fulfillment center systems 312(1)-(N), shipping service systems 314(1)-(N), and payment processing systems 316(1)-(N) may communicate via a communication network(s) 318. The communication network(s) 318 may include any or all of a private network, personal area network (PAN), Local-Area Network (LAN), Wide-Area Network (WAN), or the Internet. Further, the network connection between the application service 302, the customer devices 304(1)-(N), the client devices 308(1)-(N), the fulfillment center systems 312(1)-(N), shipping service systems 314(1)-(N), and the payment processing systems 316(1)-(N), and the communication network(s) 318 may be a wireless connection (e.g., Bluetooth, Wi-Fi connection, etc.), or a wired connection (e.g., Ethernet, universal serial bus (USB), etc.), or a combination thereof.

In some embodiments, a first customer device 304(1) is associated with a first customer 306(1), and a second customer device 304(2) is associated with a second customer 306(2), an Nth customer device 304(N) is associated with an Nth customer 306(N), and so forth. Further, in some embodiments, a first client device 308(1) is associated with a first client 310(1), a second client device 308(2) is associated with a second client 310(2), an Nth client device 308(N) is associated with an Nth client 310(N), and so forth.

Additionally, the application service 302 may provide a multi-tenant cloud computing solution to the clients 310(1)-(N). In particular, various elements of hardware and software of the application service 302 may be shared by the clients 310(1)-(N). In some embodiments, the data and services provided by the application service 302 to individual clients 310 may be securely isolated from the data and services provided to other the clients 310. Additionally, or alternatively, in some embodiments, multiple clients 310 may share access to common data and services.

As an example, the clients 310(1)-(N) may provide web applications 320(1)-(N) to the customer devices 304(1)-(N) via the application service 302. For instance, the first client 310(1) may design or operate an e-commerce web application 320(1) configured to sell clothing items to the customers 306(1)-(N). Further, the application service 302 may serve the e-commerce web application 320(1) to the customer devices 304(1)-(N) via the communication network 318, and the customers 306(1)-(N) may employ the customer devices 304(1)-(N) to submit purchase orders to the e-commerce web application 320(1).

As illustrated in FIG. 3, the application service 302 may include the web applications 320(1)-(N), a workflow management application 322, customer information 324, and client information 326. The workflow management application 322 may monitor workflow processes associated with the web applications 320(1)-(N), and provide workflow management GUIs to the clients 310(1)-(N) via the client devices 308(1)-(N). For instance, the workflow management application 322 may be an order management application configured to monitor order fulfillment processes associated with the e-commerce web application 320(1), and present an order management GUI (e.g., the order management GUI 100) corresponding to the order fulfillment processes to the client 310(1) via a web browser of the client device 308(1). A "web browser," as referred to herein, may relate to a software application or a software application component for retrieving, rendering, and presenting information resources from the World Wide Web and/or other sources.

In some embodiments, the workflow management application 322 may further present workflow management GUIs to the customers 306(1)-(N) via the customer devices 304 (1)-(N). Additionally, the workflow management GUIs provided to the customers 306(1)-(N) may have a limited view, and only display workflow information appropriate for consumption by a customer 306. For example, the customer 310(1) may be presented a workflow management GUI that displays shipping and delivery information associated with a purchase order. In some embodiments, the clients 310(1)-(N) may determine which information within a workflow management GUI is presented to a customer 306.

The customer information 324 may include data associated with the customers 306(1)-(N). As illustrated in FIG. 3, the customer information 324 may include a plurality of customer profiles 328(1)-(N). Further, an individual customer profile 328 may correspond to an individual customer 306. For instance, a first customer profile 328(1) may correspond to a first customer 306(1), a second customer profile 328(2) may correspond to a second customer 306(2), an Nth customer profile 328(N) may correspond to an Nth customer 306(N), and so forth. In some embodiments, the customer information 324 may include purchase history, shipping information, payment information, location information, customer activity, customer roles, customer workflows, customer settings, authentication information, encryption information, authorization information, biographical information, demographic information, special needs and disabilities, executed service agreements, contact information, etc.

The client information 326 may include data associated with the clients 310(1)-(N). As illustrated in FIG. 3, the client information 326 may include a plurality of client profiles 330(1)-(N). Further, an individual client profile 330 may correspond to an individual client 310. For instance, a first client profile 330(1) may correspond to a first client 310(1), a second client profile 330(2) may correspond to a second client 310(2), an Nth client profile 330(N) may correspond to an Nth client 310(N), and so forth. In some embodiments, the client information 326 may include application code, custom process code, application information, payment information, client activity, client roles, client workflows, process representation information, client settings, authentication information, encryption information, authorization information, executed service agreements, service level agreements, contact information, end-user information, etc.

In some embodiments, the customer information 324 and client information 326 may be stored within a multi-tenant database. As used herein, the term "multi-tenant database" refers to those database systems in which various elements of hardware and software of the database system may be shared by a plurality of entities, e.g., the clients 310(1)-(N). As used herein, the term "database" refers to an organized collection of data. Some examples of databases include columnar databases, relational databases, key-store databases, graph databases, and document stores. As used herein, and in some embodiments, a "record" may refer to a data entity, such as an instance of a data object created by a web application 320(1) of the application service 302. In some embodiments, a data object may correspond to a database table of a database system, a data field of the database object may correspond to a column of the database table, and a record may correspond to a row of the database table.

Further, as illustrated in FIG. 3, the workflow management application 322 may include a monitoring engine 332, a layout generator 334, and a recommendation engine 336. The monitoring engine 332 may analyze events (e.g., state changes, status updates, initiation of workflow steps, suspension of workflow steps, completion of workflow steps, workflow exceptions, etc.) within the workflow management system 300, and modify the workflow management GUIs presented to the client devices 308(1)-(N) based on the events. For instance, in some embodiments, the monitoring engine 332 may receive event information 338(1)-(N) corresponding to events at the fulfillment center systems 312(1)-(N), the shipping service systems 314(1)-(N), the payment processing systems 316(1)-(N), and the web applications 320(1)-(N). Additionally, or alternatively, the application service 302 may receive the event information 338(1)-(N) from the fulfillment center systems 312(1)-(N), the shipping service systems 314(1)-(N), the payment processing systems 316(1)-(N), and the web applications 320(1)-(N), and update the customer information 324 or the client information 326. Further, the monitoring engine 332 may monitor the customer information 326 and the client information 326 for updates triggering modifications to the workflow management GUIs.

For example, the monitoring engine 332 may receive the event information 338(1) indicating a status update of a fulfillment process within the fulfillment center system 316(1), and update a fulfillment representation associated with the fulfillment process within an order management GUI based on the status update. As another example, the monitoring engine 332 may receive the event information 338(2) including tracking information for the delivery of an order item, and update a delivery representation of the process representation associated with the delivery process within an order management GUI based on the tracking information.

The layout generator 334 may implement a layout algorithm for determining a layout of graphical representations within a process representation displayed in a workflow management GUI. As described in detail herein, the layout generator 334 may determine the alignment of graphical representations of a process representation, the spacing between graphical representations of a process representation, the position of graphical representations of a process representation, the size of graphical representations of a process representation, the graphical effects applied to graphical representations of a process representation, attributes of connection items between the graphical representations of a process representation, a direction of growth of a process representation, attributes of textual information presented with a process representation, etc.

In some embodiments, the workflow management application 322 may request that the layout generator 334 generate a layout at the initiation of a workflow process, or in response to a request for a workflow management GUI corresponding to the workflow process. Further, the workflow management application 322 may create a process representation within a workflow management GUI in accordance with the generated layout. For instance, the workflow management application 322 may add graphical representations, graphical areas, or connection items to a workflow management GUI in accordance with the layout, or edit graphical representations, graphical areas, or connection items to a workflow management GUI in accordance with the layout. As an example, the layout generator 334 may determine a size for graphical representations for a process representation corresponding to fulfillment of a purchase order for clothing items. Further, the workflow management application 322 may size the graphical representations within the process representation in accordance with the determined size as the workflow process is performed. In some embodiments, the layout generator 334 may further modify the layout while the workflow process is performed.

In some embodiments, the layout generator 334 may determine the layout based on the client information 326 or the customer information 324. For instance, the layout generator 334 may identify trends and/or patterns within historical process representation information. Further, the layout generator 334 may generate a layout based on the trends and/or patterns. For instance, in some embodiments, the layout generator 334 may employ machine learning techniques and/or pattern recognition techniques to generate a layout for a process representation corresponding to a workflow. Additionally, in some embodiments, user administrators may set or customize one or more attributes of the layout.

The recommendation engine 336 may determine recommend actions to perform in response to workflow exceptions. For instance, the recommendation engine 336 may determine a recommend action to be presented with a recommended action control. In some embodiments, the recommendation engine 336 may determine the recommended actions based at least in part on the customer information 324, the client information 326, the event information 338(1)-(N), or the monitoring engine 332. For example, the recommendation engine 336 identify one or more actions performed by the clients 310(1)-(N) in response to a particular workflow exception, and present the recommend action to a client 310(1) as a recommended action control in response to an occurrence of the workflow exception. In some embodiments, the recommendation engine 336 may employ machine learning techniques and/or pattern recognition techniques to determine the recommended actions. For instance, the recommendation engine 336 may utilize hidden Markov models, decision trees, regression models, support vector machines, or artificial neural networks for determining the recommendation actions.

Further, in some embodiments, the workflow processes may be standard processes determined by an operator of the application service 302. Further, the clients 310(1)-(N) may provide custom processes that may be represented in the workflow management GUIs. For example, the workflow management application 322 may implement and execute custom processes provided by the clients 310(1)-(N). Further, the monitoring engine 332 may monitor the custom processes, and update the workflow management GUIs based on the custom processes. For instance, the monitoring engine 332 may detect an event associated with a custom process and update a custom process representation displayed within a process representation of a workflow management GUI.

Figure 4:
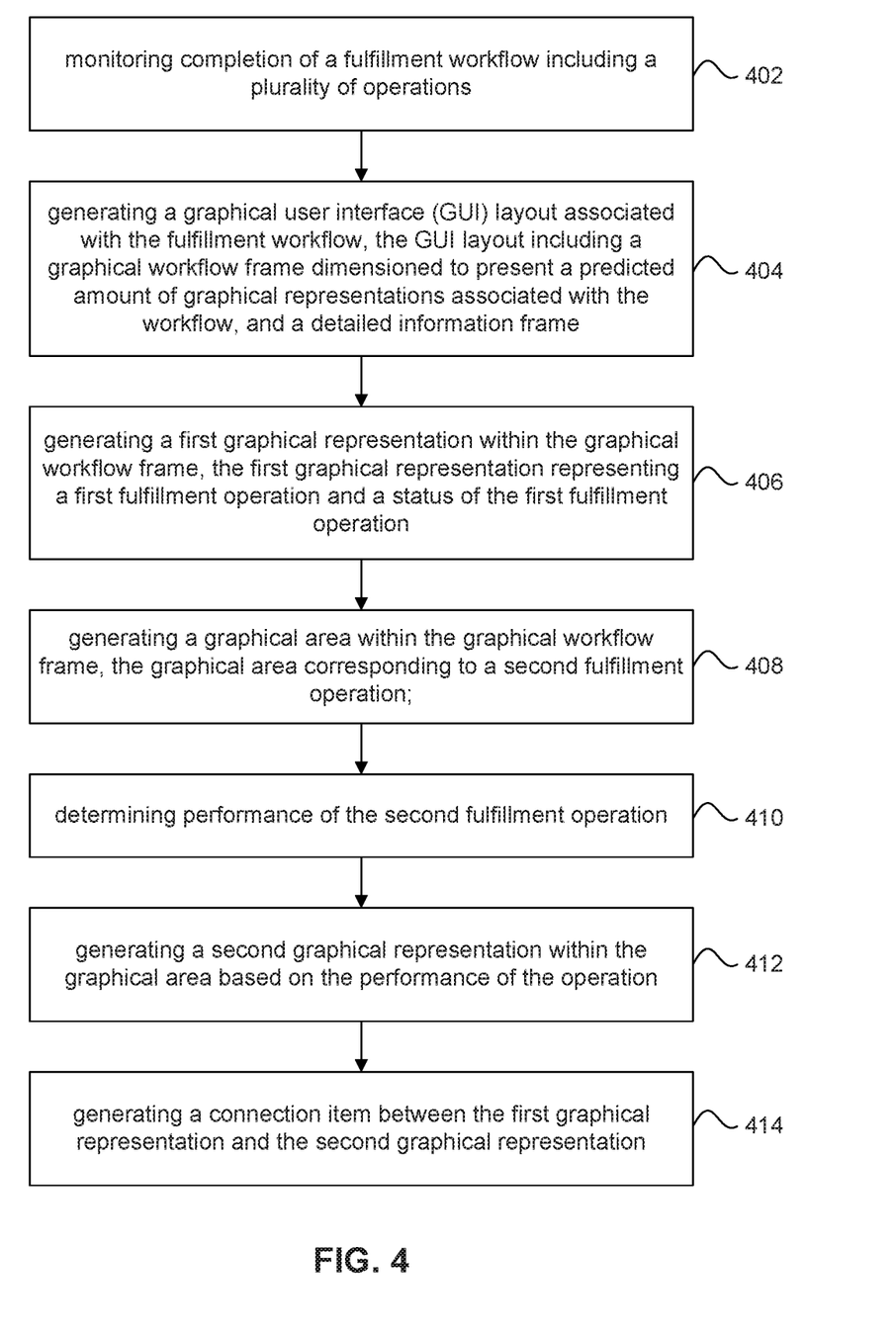
FIG. 4 illustrates an example method for implementing an order management GUI, according to some embodiments of the present disclosure.

FIG. 4 illustrates a method 400 for implementing an order management GUI, according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

At step 402, an application service monitors completion of a workflow associated with a purchase order, the workflow including a plurality of operations for providing a product to a customer. For example, the monitoring engine 332 may monitor the completion of a workflow process for fulfillment of a purchase order of clothing items by a customer 306(1).

At step 404, the application service generates a graphical user interface (GUI) layout associated with the purchase order, the GUI layout including a graphical workflow frame 102 dimensioned to present a predicted amount of graphical representations associated with the workflow, and a detailed information frame 106. For example, the layout generator 334 may determine a GUI layout based on one or more attributes of the purchase order. As described in detail herein, the GUI layout may include a graphical workflow frame 102 for displaying a process representation 104 corresponding to the fulfillment workflow for providing the laptop to the customer 306(1), and a detailed information frame 106 for displaying information associated with the fulfillment workflow for providing the clothing items to the customer 306(1). In some embodiments, the layout generator 334 may determine the GUI layout based at least in part on historical process representation 104 associated with the fulfillment workflow for providing the clothing items to the customer 306(1). For instance, the layout generator 334 may determine the GUI layout based at least in part on one or more process representations associated with the customer 306(1) or another customer having a related attribute (e.g., delivery addresses in the same geographic region), the client 310(1) providing the clothing items to the customer 306(1) or a client having a related attribute (e.g., a client having a similar customer rating to the customer), the shipping entity performing the delivery process, the clothing items or another product having a related attribute (e.g., a product within the same price range as the clothing items), etc.

At step 406, the application service generates a first graphical representation within the graphical workflow frame, the first graphical representation representing the purchase order and the order status. For example, the order management application may present the graphical workflow frame 102 to the client device 308(1). Further, the graphical workflow frame 102 may include a process representation 104 corresponding to the fulfillment workflow for providing the clothing items to the customer 306(1). In addition, the process representation 104 may include the order representation 108(1) corresponding to the purchase order. In some embodiments, the order representation 108(1) may include textual information indicating the order status of the purchase order. Some examples of the order status include open, closed, fulfilled, suspended, under review, etc.

At step 408, the application service generates a graphical area within the graphical workflow frame, the graphical area corresponding to an operation of the plurality of operations for providing the product to the customer. For example, the order management application may generate the first graphical area 118(1) for graphical representations 108 corresponding to the order management of the clothing items.

At step 410, the application service determines performance of the operation based on the monitoring. For example, the monitoring engine 332 may determine that two clothing items of the purchase order have been ordered with a first class shipping option based on event information 338(1) received from the shipping service system 314(1) or the e-commerce web application.

At step 412, the application service generates a second graphical representation within the graphical area based on the performance of the operation. For example, the order management application may generate the first order item representation 108(7), corresponding to the clothing items ordered with the first class shipping option, within the process representation 104.

At step 414, the application service generates a connection item between the first graphical representation and the second graphical representation. For example, the order management application may generate the connection item 120(1) between the order representation 108(1) and the first order item representation 108(7). Further, the order management application may set an attribute of the connection item 120(1) based on at least one of the fulfillment workflow associated with the order representation 108(1) or the order management process associated with the first order item representation 108(7). For instance, the order management application may set the color of the connection item 120(1)

to grey based on the fulfillment workflow and the order management process being free of any workflow exceptions.

Figure 5:
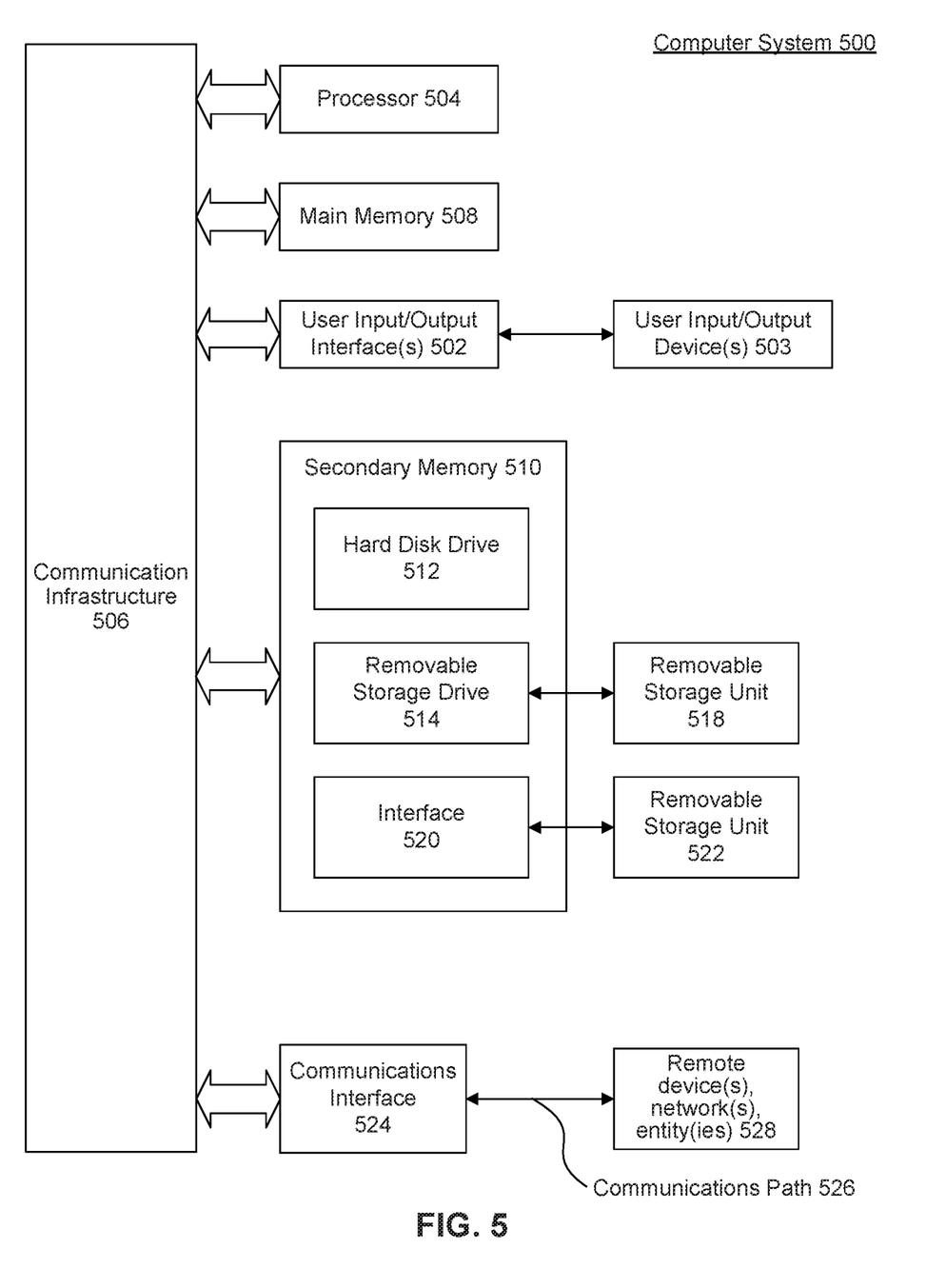
FIG. 5 illustrates a computer system, according to exemplary embodiments of the present disclosure.

FIG. 5 is an example computer system useful for implementing various embodiments. Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 502, such as monitors, keyboards, pointing devices, etc., which may communicate with communication infrastructure or bus 506 through user input/output device(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   monitoring completion of a workflow associated with a purchase order, the workflow including a plurality of operations for providing a product to a customer;
   generating a graphical user interface (GUI) layout associated with the purchase order, the GUI layout including a graphical workflow frame dimensioned to present a predicted amount of graphical representations associated with the workflow including an amount of graphical representations that may be added to the workflow to fulfill the purchase order, and a detailed information frame, wherein the predicted amount of graphical representations associated with the workflow is determined based on an attribute of the purchase order;
   generating a first graphical representation within the graphical workflow frame, the first graphical representation representing the purchase order and an order status;
   generating a graphical area within the graphical workflow frame, the graphical area corresponding to an operation of the plurality of operations for providing the product to the customer;
   determining performance of the operation based on the monitoring;
   generating a second graphical representation within the graphical area based on the performance of the operation; and
   generating a connection item between the first graphical representation and the second graphical representation, wherein an alignment of the second graphical representation relative to the first graphical representation is selected based on a likelihood that the connection item is generated.

2. The method of claim 1, further comprising:
   receiving, via a GUI, selection of the second graphical representation; and
   presenting detailed information corresponding to the second graphical representation within the detailed information frame.

3. The method of claim 1, further comprising:
   determining a workflow alert based on the plurality of operations; and
   presenting a third graphical representation associated with the workflow alert.

4. The method of claim 3, further comprising:
   presenting a fourth graphical representation selectable to trigger a recommended action to perform in response to the workflow alert; and
   performing the recommended action based at least in part on a selection of the fourth graphical representation.

5. The method of claim 1, further comprising:
   presenting a third graphical representation corresponding to a custom process;
   determining an event based on performing the custom process; and
   updating the third graphical representation based on the event.

6. The method of claim 1, wherein the connection item is a first connection item, the second graphical representation includes a fulfillment representation corresponding to a fulfillment order, and further comprising:
   presenting an invoice representation including payment information corresponding to the fulfillment order;
   presenting a third connection item from the fulfillment representation to the invoice representation;
   presenting a delivery representation including delivery information corresponding to the fulfillment order;
   presenting a fourth connection item from the fulfillment representation to the invoice representation; and
   vertically aligning the invoice representation and the delivery representation.

7. The method of claim 1, wherein the plurality of operations are a first plurality of operations, the connection item is a first connection item, the graphical area is a first graphical area, and further comprising:
   generating a second graphical area within the graphical workflow frame, the second graphical area corresponding to a second plurality of operations dependent upon the operation;
   presenting a plurality of graphical representations within the second graphical area;
   presenting a second connection item between the second graphical representation and the plurality of graphical representations; and aligning the plurality of graphical representations within the second graphical area.

8. The method of claim 1, wherein generating the connection item between the first graphical representation and the second graphical representation comprises:
applying a graphical effect to the connection item based on the order status.

9. A system comprising:
a memory; and
one or more processors and/or circuits coupled to the memory and configured to:
monitor completion of a workflow associated with a purchase order, the workflow including a plurality of operations for providing a product to a customer;
generate a graphical user interface (GUI) layout associated with the purchase order, the GUI layout including a graphical workflow frame dimensioned to present a predicted amount of graphical representations associated with the workflow including an amount of graphical representations that may be added to the workflow to fulfill the purchase order, and a detailed information frame, wherein the predicted amount of graphical representations associated with the workflow is determined based on an attribute of the purchase order;
generate a first graphical representation within the graphical workflow frame, the first graphical representation representing the purchase order and an order status;
generate a graphical area within the graphical workflow frame, the graphical area corresponding to an operation of the plurality of operations for providing the product to the customer;
determine performance of the operation based on the monitoring;
generate a second graphical representation within the graphical area based on the performance of the operation; and
generate a connection item between the first graphical representation and the second graphical representation, wherein an alignment of the second graphical representation relative to the first graphical representation is selected based on a likelihood that the connection item is generated.

10. The system of claim 9, wherein the one or more processors and/or circuits are further configured to:
receive, via a GUI, selection of the second graphical representation; and
present detailed information corresponding to the second graphical representation within the detailed information frame.

11. The system of claim 9, wherein the one or more processors and/or circuits are further configured to:
present a third graphical representation selectable to trigger a recommended action to perform in response to a workflow alert; and
perform the recommended action based at least in part on a selection of the third graphical representation.

12. The system of claim 9, wherein the connection item is a first connection item, the second graphical representation includes a fulfillment representation corresponding to a fulfillment order, and the one or more processors and/or circuits are further configured to:
present an invoice representation including payment information corresponding to the fulfillment order;
present a third connection item from the fulfillment representation to the invoice representation;
present a delivery representation including delivery information corresponding to the fulfillment order;
present a fourth connection item from the fulfillment representation to the invoice representation; and
align the invoice representation and the delivery representation.

13. The system of claim 9, wherein the plurality of operations are a first plurality of operations, the connection item is a first connection item, the graphical area is a first graphical area, and the one or more processors and/or circuits are further configured to:
generate a second graphical area within the graphical workflow frame, the second graphical area corresponding to a second plurality of operations dependent upon the operation;
present a plurality of graphical representations within the second graphical area;
present a second connection item between the second graphical representation and the plurality of graphical representations; and
align the plurality of graphical representations within the second graphical area.

14. A non-transitory computer-readable device having instructions stored thereon that, when executed by at least one computing device, cause the at least one computing device to perform operations comprising:
monitoring completion of a fulfillment workflow including a plurality of workflow operations;
generating a graphical user interface (GUI) layout associated with the fulfillment workflow, the GUI layout including a graphical workflow frame dimensioned to present a predicted amount of graphical representations associated with the fulfillment workflow including an amount of graphical representations that may be added to the workflow to fulfill the purchase order, and a detailed information frame, wherein the predicted amount of graphical representations associated with the workflow is determined based on an attribute of the purchase order;
generating a first graphical representation within the graphical workflow frame, the first graphical representation representing a first fulfillment operation of the plurality of workflow operations and a status of the first fulfillment operation;
generating a graphical area within the graphical workflow frame, the graphical area corresponding to a second fulfillment operation of the plurality of workflow operations;
determining performance of the second fulfillment operation of the plurality of workflow operations;
generating a second graphical representation within the graphical area based on the performance of the second fulfillment operation; and
generating a connection item between the first graphical representation and the second graphical representation, wherein an alignment of the second graphical representation relative to the first graphical representation is selected based on a likelihood that the connection item is generated.

15. The non-transitory computer-readable device of claim 14, the operations further comprising:
receiving, via a GUI, selection of the second graphical representation; and
presenting detailed information corresponding to the second graphical representation within the detailed information frame.

16. The non-transitory computer-readable device of claim 14, the operations further comprising:
   determining a workflow alert based on the plurality of workflow operations; and
   presenting a third graphical representation associated with the workflow alert.

17. The non-transitory computer-readable device of claim 16, the operations further comprising:
   presenting a fourth graphical representation selectable to trigger a recommended action to perform in response to the workflow alert; and
   performing the recommended action based at least in part on a selection of the fourth graphical representation.

18. The non-transitory computer-readable device of claim 14, the operations further comprising:
   presenting a third graphical representation corresponding to a custom process;
   determining an event based on performing the custom process; and
   updating the third graphical representation based on the event.

19. The non-transitory computer-readable device of claim 14, wherein the connection item is a first connection item, the second graphical representation includes a fulfillment representation corresponding to a fulfillment order, and the operations further comprising:
   presenting an invoice representation including payment information corresponding to the fulfillment order;
   presenting a third connection item from the fulfillment representation to the invoice representation;
   presenting a delivery representation including delivery information corresponding to the fulfillment order;
   presenting a fourth connection item from the fulfillment representation to the invoice representation; and
   vertically aligning the invoice representation and the delivery representation.

20. The non-transitory computer-readable device of claim 14, wherein the plurality of workflow operations are a first plurality of workflow operations, the connection item is a first connection item, the graphical area is a first graphical area, and the operations further comprising:
   generating a second graphical area within the graphical workflow frame, the second graphical area corresponding to a second plurality of workflow operations dependent upon the second fulfilment operation;
   presenting a plurality of graphical representations within the second graphical area;
   presenting a second connection item between the second graphical representation and the plurality of graphical representations; and
   aligning the plurality of graphical representations within the second graphical area.

* * * * *